United States Patent
Tripathi et al.

(10) Patent No.: US 9,035,961 B2
(45) Date of Patent: May 19, 2015

(54) DISPLAY PIPE ALTERNATE CACHE HINT

(75) Inventors: Brijesh Tripathi, Los Altos, CA (US);
Peter F. Holland, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 286 days.

(21) Appl. No.: 13/610,633

(22) Filed: Sep. 11, 2012

(65) Prior Publication Data
US 2014/0075117 A1 Mar. 13, 2014

(51) Int. Cl.
*G09G 5/36* (2006.01)
*G06F 12/08* (2006.01)
*G09G 5/39* (2006.01)
*G09G 5/00* (2006.01)
*G09G 5/395* (2006.01)

(52) U.S. Cl.
CPC ............ *G06F 12/0888* (2013.01); *G09G 5/001* (2013.01); *G09G 5/363* (2013.01); *G09G 5/39* (2013.01); *G09G 5/395* (2013.01); *G09G 2360/121* (2013.01); *G09G 2360/123* (2013.01); *G06F 2212/455* (2013.01); *Y02B 60/1225* (2013.01)

(58) Field of Classification Search
None
See application file for complete search history.

(56) References Cited

U.S. PATENT DOCUMENTS

| | | | |
|---|---|---|---|
| 5,829,025 A * | 10/1998 | Mittal | 711/122 |
| 6,256,710 B1 | 7/2001 | Yazdy et al. | |
| 6,460,115 B1 * | 10/2002 | Kahle et al. | 711/122 |
| 6,643,745 B1 * | 11/2003 | Palanca et al. | 711/138 |
| 6,721,847 B2 * | 4/2004 | Hursey | 711/118 |
| 7,975,107 B2 | 7/2011 | Beckmann et al. | |
| 8,127,088 B2 | 2/2012 | Kolovson | |
| 8,140,771 B2 | 3/2012 | Arimilli et al. | |
| 8,234,478 B1 * | 7/2012 | Roberts et al. | 711/167 |
| 8,244,981 B2 | 8/2012 | Wang et al. | |
| 2007/0079073 A1 * | 4/2007 | Rosenbluth et al. | 711/134 |
| 2009/0106496 A1 | 4/2009 | Knebel | |
| 2009/0132764 A1 | 5/2009 | Moll et al. | |

FOREIGN PATENT DOCUMENTS

TW 200608198 A 3/2006

OTHER PUBLICATIONS

International Search Report and Written Opinion in application No. PCT/US2013/058881 mailed Dec. 3, 2013 pp. 1-8.
Office Action in Taiwan Patent Application No. 102132822, mailed Feb. 5, 2015, 8 pages.

* cited by examiner

*Primary Examiner* — Devona Faulk
*Assistant Examiner* — William Beutel
(74) *Attorney, Agent, or Firm* — Rory D. Rankin; Meyertons, Hood, Kivlin, Kowert & Goetzel, P.C.

(57) ABSTRACT

A system and method for efficiently allocating data in a memory hierarchy. A system includes a memory controller for controlling accesses to a memory and a display controller for processing video frame data. The memory controller includes a cache capable of storing data read from the memory. A given video frame may be processed by the display controller and presented on a respective display screen. During processing, control logic within the display controller sends multiple memory access requests to the memory controller with cache hint information. For the frame data, the cache hint information may alternate between (i) indicating to store frame data read in response to respective requests in the memory cache and (ii) indicating to not store the frame data read in response to respective requests in the memory cache.

19 Claims, 6 Drawing Sheets

DISPLAY PIPE ALTERNATE CACHE HINT

BACKGROUND OF THE INVENTION

1. Field of the Invention

This invention relates to electronic circuits, and more particularly, to efficiently allocating data in a memory hierarchy.

2. Description of the Relevant Art

Lower-level memory in a computing system, such as off-chip dynamic random access memory (DRAM) and hard drives, provides relatively inexpensive data storage compared to on-chip caches. However, when servicing data access requests for one or more software applications, the access times of lower-level memory may be appreciable and impact system performance.

One approach to improving performance involves using one or more caches to reduce data access latencies. While using caches can improve performance, various issues may reduce the effectiveness of cache performance. For example, conflict, or collision, misses occur within a set-associative or a direct-mapped cache when too many blocks map to a same set. The misses cause one or more blocks to be discarded within that set. As a consequence, the average memory latency for a given source in the system may be degraded due to the misses. This problem may become worse when two or more sources use the cache for data storage. For example, a video subsystem in a computing system may include multiple sources for video data. The design of a smartphone or computer tablet may include user interface layers, cameras, and video sources such as media players. Each of these sources may utilize video data stored in memory. If each of these sources attempts to store respective data in the cache, both the conflict misses and the frequency of data eviction may increase and thereby cause a reduction in overall system performance. Additionally, power consumption may increase due to such evictions. Further, logic for replacement algorithms and queues used to send evicted data to lower-level memory may consume additional power.

In view of the above, methods and mechanisms for efficiently allocating data in a memory hierarchy are desired.

SUMMARY OF EMBODIMENTS

Systems and methods for efficiently allocating data in a memory hierarchy are contemplated. In various embodiments, a semiconductor chip includes a memory controller and a display controller. The memory controller may control accesses to a memory, such as an external memory located off of the semiconductor chip. The memory controller may be connected to a memory cache. The memory cache may store data read from the memory, such as video frame data corresponding to a frame buffer. The display controller may include one or more internal pixel-processing pipelines. Each of the pipelines may be able to process the video data received from the memory controller for a respective video source.

A given video frame may be processed by the display controller and presented on a respective display screen. During processing, control logic within the display controller may send multiple memory access requests to the memory controller with cache hint information. For the video frame data in the frame buffer, the cache hint information may alternate between (i) indicating to store frame data read in response to respective requests in the memory cache and (ii) indicating to not store the frame data read in response to respective requests in the memory cache. A number of consecutive memory access requests to send before alternating the cache hint information may be based on at least one of the following: a given one of the one or more internal pipelines currently generating memory access requests, utilization of the memory cache, a power-performance state of the system comprising the memory cache, and a number of functional blocks external to the display controller capable of accessing the memory cache, which are currently accessing the memory cache.

These and other embodiments will be further appreciated upon reference to the following description and drawings.

Figure 1:
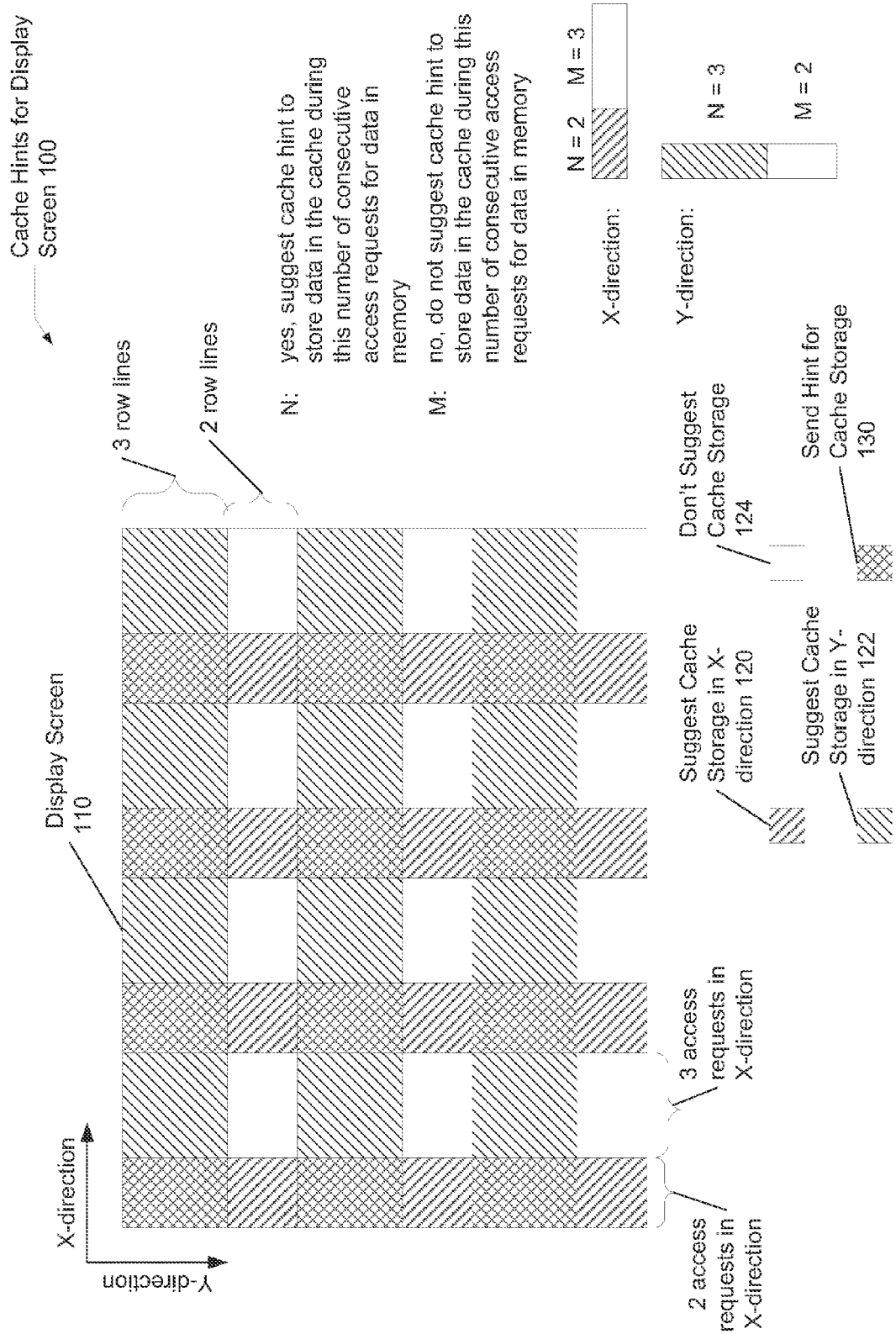
FIG. 1 is a generalized block diagram of cache hints for a display screen.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six, interpretation for that unit/circuit/component.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention.

Referring to FIG. 1, a generalized block diagram of one embodiment of cache hints 100 for a display screen is shown. In various embodiments, the display 110 is a monitor used in a mobile computing device, such as a smartphone or a computer tablet. The display 110 may be a thin film transistor liquid crystal display (TFT-LCD) panel. Alternatively, the display 110 may be a monitor that utilizes an organic light-emitting diode (OLED) or other suitable technology. Further, the display 110 may be a modern TV or other type of computer monitor or display screen.

For LCD and OLED displays, an active-matrix structure is used that utilizes a thin-film transistor backplane to switch individual pixels on and off. The active matrix structure includes multiple row lines and multiple column lines. When a row line is selected, each of the column lines is connected to a row of pixels, wherein a single transistor may be used to implement the pixel. A row line may include hundreds to over a thousand pixels. Voltage values related to picture information may be applied to respective lines of the column lines. Afterward, the selected row line may be deselected. Following, a next row line may be selected.

The display screen 110 may provide the output of images based on the state of the pixels within each row line. The video data corresponding to the display screen 110 may be stored in memory, such as off-die synchronous dynamic random access memory (SDRAM), used to store video data in frame buffers. A frame buffer may store data, such as video frames (which may include or consist of graphics), for a corresponding display screen. An on-die cache may be also be used to store video data to reduce the latency of memory accesses.

The display screen 110 may include several row lines, wherein each row line may include hundreds to over a thousand pixels of video information. The video information for a given row line may be divided into a number of portions. Here, the portions are referred to as columns. The number of columns may be set by a variety of factors. One factor may be a number of memory channels. Each column may be assigned to a respective memory channel. The even distribution of the data storage may allow for more efficient techniques to be used for video encoding, raster graphics and so forth. Another factor may be a given size of a data chunk or segment, such as 256 or 512 bytes. The segments, or columns, may be assigned from left to right to the memory channels in a round-robin fashion. The method of data distribution may be chosen to allow for more efficient techniques to be used for video processing.

When an image is being presented on the display screen 110, the top-most row line, referred to as row line 0, may be selected. The left-most column on the row line 0 may have corresponding data accessed and sent to a graphics processing unit (GPU) for processing, or rendering. The resulting rendered data is sent to the display screen 110 to be presented. One or more memory access requests may be sent to a memory controller to obtain the corresponding video data. For example, the left-most column may have a 256-byte size, but each memory access request handles 64 bytes. Therefore, 4 memory access requests may be used to obtain the entire left-most column. The memory controller may communicate with a given one of the memory channels to obtain the video data from SDRAM. Alternatively, the memory controller may access a cache to obtain the corresponding video data. The cache may provide a lower latency access than the SDRAM.

When the memory controller receives the memory access request for the video data, the memory controller may also receive cache hint information. The cache hint information may indicate storing the corresponding video data in the on-die cache. For example, the hint information 130 may indicate suggesting cache data storage to the memory controller. Alternatively, the cache hint information may indicate storing the corresponding data in the off-die SDRAM, rather than the on-die cache.

Control logic within a display controller may utilize suggested cache hint information 120-124 to determine whether to send the hint information 130 to the memory controller for a given memory access request. The hint information 130 offers a suggestion to the memory controller to store the corresponding video data in the on-die cache. If the control logic within the display controller does not determine the hint information 130 is to be sent, then the display controller may send hint information suggesting the corresponding video data not be cached. Below, further details for the suggested hint information 120-124 and the parameters N and M are provided.

In various embodiments, a number N of successive memory access requests to include hint information indicating storing data in the on-die cache may be set for a given direction on the display screen 110. For example, with N equal to 2 for the x-direction on the display screen 110, two successive or consecutive memory access requests moving from left to the right in the x-direction may be associated with the hint information indicating storing data in the on-die cache. In some embodiments, each memory access request may be associated with a given segment size, such as 64 bytes. The information 120 may illustrate the suggestion of storing data in the on-die cache associated with areas on the display screen 110 moving from left to right in the x-direction.

Additionally, a number M of successive memory access requests to include hint information indicating data is not to be cached may be set for a given direction on the display screen 110. For example, with M equal to 3 for the x-direction on the display screen 110, three successive or consecutive memory access requests moving from left to the right in the x-direction may be associated with the hint information indicating storing data outside the on-die cache. The information 124 may illustrate the suggestion of storing data outside the on-die cache, wherein the data is associated with areas on the display screen 110.

In some embodiments, the parameter M follows the parameter N. In one example, N=2 and M=3. Therefore, for the left-to-right horizontal (x-axis) direction on the display screen 110, two successive memory access requests may be associated with a suggestion to store corresponding video data in the on-die cache. Following, three successive memory access requests may be associated with a suggestion to not store corresponding video data in the on-die cache. Rather, the video data may continue to be stored in the off-die SDRAM. The pattern may repeat, as the next two successive memory access requests may be associated with a suggestion to store corresponding video data in the on-die cache. However, in other embodiments, the parameter N may follow the parameter M. In yet other embodiments, a third programmable parameter, S, may determine which of the N and the M parameters follows the other.

Similarly, a number N of successive memory access requests to include hint information indicating storing data in the on-die cache may be set for the y-direction on the display screen 110. For example, with N equal to 3 for the y-direction on the display screen 110, three successive memory access requests moving from top to bottom in the y-direction may be associated with the hint information indicating storing data in the on-die cache. The information 122 may illustrate the suggestion of storing data in the on-die cache associated with areas on the display screen 110 moving from top to bottom in the y-direction.

In addition, a number M of successive memory access requests to include hint information indicating storing data outside the on-die cache may be set for the y-direction on the display screen 110. For example, with M equal to 2 for the y-direction on the display screen 110, two successive memory access requests moving from top to bottom in the y-direction may be associated with the hint information indicating not storing data in the on-die cache. The information 124 may illustrate the suggestion of storing data outside the on-die cache associated with areas on the display screen 110. The y-direction, or the vertical direction, may also have an associated S parameter as described earlier regarding the horizontal direction.

It is noted that in various embodiments, the parameters N and M may correspond to adjacent blocks of data as they appear on the display screen. In some embodiments, this may correspond to consecutive read accesses. For example, if N=3 is used to indicate caching is desired, the consecutive blocks described by the "3" in the N parameter may refer to 3 adjacent blocks on the display—whether or not the read accesses for these 3 blocks are themselves consecutive. In other cases, the parameters may refer to the accesses themselves—irrespective of whether or not consecutive read accesses refer to adjacent blocks on a display. All such embodiments are contemplated. For ease of discussion, the parameters will generally here refer to the read accesses themselves and it may be assumed that consecutive reads generally refer to adjacent blocks on a display. However, as noted above, the methods and mechanisms described herein are not intended to be limited by such discussion.

Control logic within the display controller may use the information 120-124 to determine whether to send hint information 130 to the memory controller to indicate suggesting cache data storage for video data associated with the memory access request. For example, for a given segment, such as a 64-byte segment, on the display screen 110, if both the information 120 and the information 122 are associated with the segment, then there is an overlap. In response to determining this overlap, the control logic may send the hint information 130 to the memory controller.

Alternating the cache hint information while reading video data for a given video frame may even out the latency spikes in the frame fetch sequence and may reduce peak power consumption spikes as well. For example, in response to determining power consumption is to be reduced, the number N may be set to a value equal to at least a number of memory access requests used to read frame data for an entire row line of the display screen 110. This type of setting may create stripes of the information 130 across the display screen 110. In response to determining memory access latency is to be reduced, the numbers N and M may be set to respective values less than a number of memory access requests used to read frame data for an entire row line of a respective display. This type of setting may create a checkerboard-like pattern of the information 130 across the display screen 110.

Continuing with the above description for the control logic within the display controller, the control logic may not determine the above-described overlap. If there is no overlap, then hint information suggesting data storage outside the on-die cache may be sent to the memory controller. The information 120 for the x-direction may be thought of abstractly as a blue color. The information 122 for the y-direction may be thought of abstractly as a yellow color. The information 124 for both x- and y-directions may be though of abstractly as a transparent color. When the information 120 and the information 122 overlap for a given segment on the display screen 110, a green color results. The hint information 130 may be sent to the memory controller when the green color results.

Data for a second column next to the left-most column within the top-most row line 0 may be accessed and processed. Again, in some embodiments, the column size may be larger than a memory access size. For a column size of 256 bytes, 4 64-byte memory access requests are used to obtain the associated video data. The resulting processed data may be sent to the display screen 110 to be presented. Again, a memory access request may be sent to the memory controller to obtain the corresponding video data. Prior to sending the memory access request, control logic within the display controller may determine from the suggested information 120-124 for the x- and y-directions whether to send the hint information 130 with the memory access request.

When the video data for the top-most row line 0 is accessed and processed, row line 0 is deselected and the row line 1, which is below row line 0, is selected. Following this, the data access steps described for row line 0 are repeated for row line 1. Afterward, the steps are repeated for row lines 2 and so on until the bottom of the display screen 110 is reached. In this manner, cache hint information for an entire video frame to be presented on the display screen 110 is not constant. As shown, a checkerboard area on the display screen 110 may be associated with the hint information 130, rather than the entire display screen 110.

The parameters N and M may be changed for each of the x- and y-directions. For example, the parameters N and M may be set to suggest a first row line has its associated video data stored in the on-die cache, whereas a second row line has it associated video data stored outside the on-die cache, such as in the off-die SDRAM. In this manner, stripes are created across the display screen 110, rather than a checkerboard, for areas associated with the hint information 130 sent from the display controller to the memory controller. Creating stripes across the display screen 110 for areas associated with the hint information 130 may reduce overall power consumption. Creating a checkerboard across the display screen 110 for areas associated with the hint information 130 may reduce overall access latency.

Figure 2:
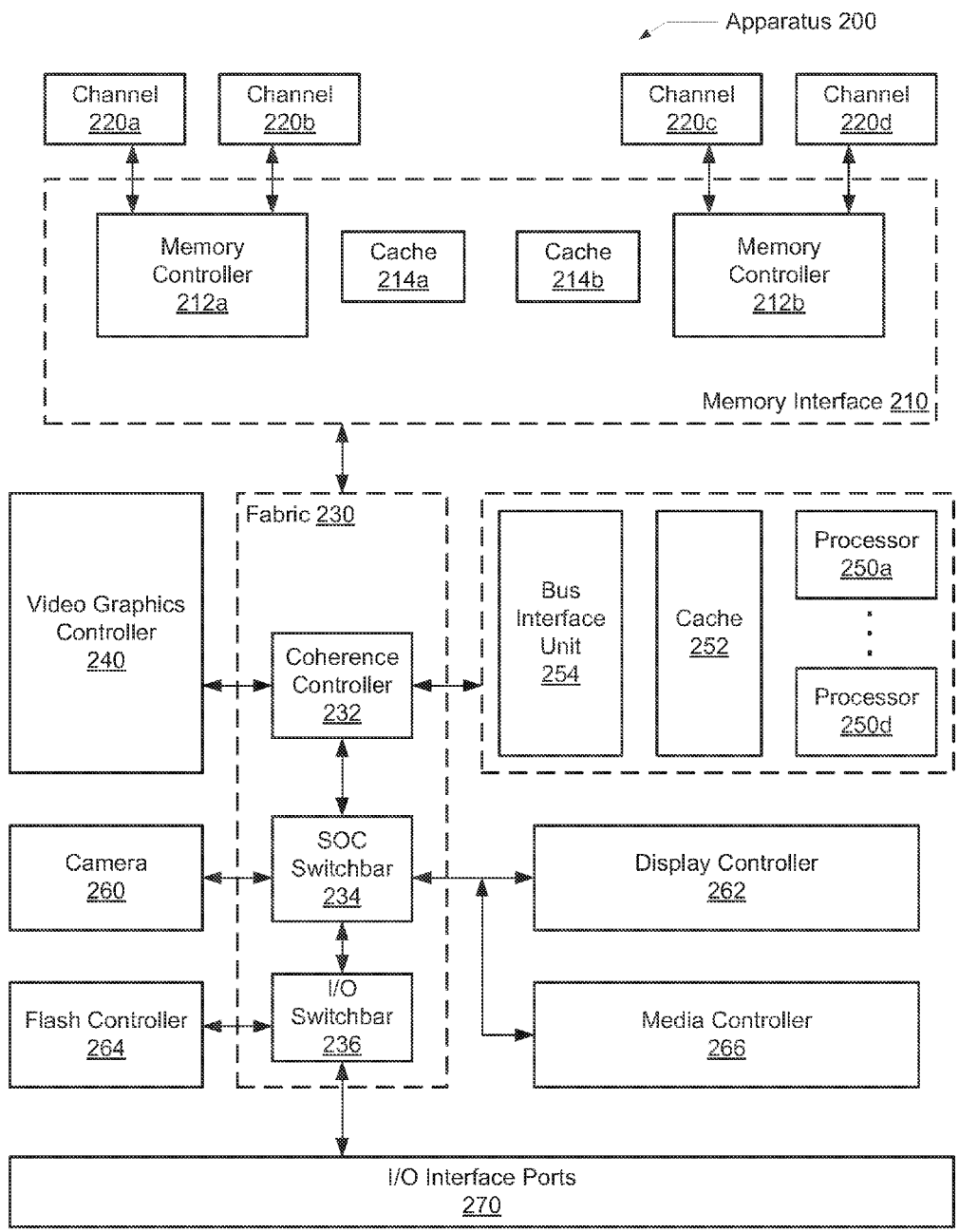
FIG. 2 is a generalized block diagram of an apparatus capable of using cache hint information for graphics data.

Referring to FIG. 2, a generalized block diagram illustrating one embodiment of an apparatus 200 capable of using cache hint information for graphics data is shown. The apparatus 200 includes multiple functional blocks or units. In some embodiments, the multiple functional units are individual dies on an integrated circuit (IC), such as a system-on-a-chip (SOC). In other embodiments, the multiple functional units are individual dies within a package, such as a multi-chip module (MCM). In yet other embodiments, the multiple functional units are individual dies or chips on a printed circuit board. The multiple functional blocks or units may each be capable of accessing a shared memory.

In various embodiments, the apparatus 200 is a SOC that includes multiple types of IC designs on a single semiconductor die, wherein each IC design provides a separate functionality. The IC designs on the apparatus 200 may also be referred to as functional blocks on the apparatus 200. Traditionally, each one of the types of IC designs, or functional blocks, may have been manufactured on a separate silicon wafer. In the illustrated embodiment, the apparatus 200 includes multiple IC designs; a fabric 230 for high-level interconnects and chip communication, a memory interface 210, and various input/output (I/O) interfaces 270. Clock sources, such as phase lock loops (PLLs), and a centralized control block for at least power management are not shown for ease of illustration.

The multiple IC designs within the apparatus 200 may include various analog, digital, mixed-signal and radio-frequency (RF) blocks. For example, the apparatus 200 may include one or more processors 250a-250d with a supporting cache hierarchy that includes at least cache 252. In some embodiments, the cache 252 may be a shared level two (L2) cache for the processors 250a-250d. In addition, the multiple IC designs may include a display controller 260, a flash memory controller 264, and a media controller 266. Further, the multiple IC designs may include a video graphics controller 240 and one or more processing blocks associated with real-time memory performance for display and camera subsystems, such as camera 260.

Any real-time memory peripheral processing blocks may include image blender capability and other camera image processing capabilities as is well known in the art. The apparatus 200 may group processing blocks associated with non-real-time memory performance, such as the media controller 266, for image scaling, rotating, and color space conversion, accelerated video decoding for encoded movies, audio processing and so forth. The units 260 and 266 may include analog and digital encoders, decoders, and other signal processing blocks. In other embodiments, the apparatus 200 may include other types of processing blocks in addition to or in place of the blocks shown.

In various embodiments, the fabric 230 provides a top-level interconnect for the apparatus 200. For example, connections to the cache coherence controller 232 may exist for various requestors within the apparatus 200. A requestor may be one of the multiple IC designs on the apparatus 200. The cache coherence controller 232 may provide to the multiple IC designs a consistent data value for a given data block in the shared memory, such as off-chip dynamic random access memory (DRAM). The coherence controller 232 may use a cache coherency protocol for memory accesses to and from the memory interface 210 and one or more caches in the multiple IC designs on the apparatus 200. An example of a cache coherency protocol includes the MOESI protocol with the Modified (M), Owned (O), Exclusive (E), Shared (S), and Invalid (I) states.

In some embodiments, one requestor connection to the coherence controller 232 may be provided for one or more graphics processing units (GPUs) within the video graphics controller 240, one requestor connection for the processor cores 250a-250d, and one request connection for the remainder of the multiple IC designs and the I/O interface ports 270 on the apparatus 200. The SOC switchbar 234 may be used to aggregate traffic from these remaining multiple IC designs.

In various embodiments, different types of traffic may flow independently through the fabric 230. The independent flow may be accomplished by allowing a single physical fabric bus to include a number of overlaying virtual channels, or dedicated source and destination buffers, each carrying a different type of traffic. Each channel may be independently flow controlled with no dependence between transactions in different channels.

The memory interface 210 may include one or more memory controllers and one or more memory caches for the off-chip memory, such as SDRAM. The memory caches may be used to reduce the demands on memory bandwidth and average power consumption. In various embodiments, the memory interface 210 includes memory controllers 212a-212b and memory caches 214a-214b. In some embodiments, bus traffic may be routed through two symmetric bus classes, such as a left bus class and aright bus class. Therefore, two memory controllers 212a-212b and two memory caches 214a-214b may be used. Although two memory controllers 212a-212b and two caches 214a-214b are shown, in various other embodiments a single memory controller and a single memory cache may be used.

As shown, in some embodiments, the memory controllers 212a-212b may not be a coherency point within the apparatus 200 as they are separate from the coherence controller 232. This separation may allow an associated system level memory cache, such as caches 214a-214b, to be inserted in the path to memory. The memory caches 214a-214b may be logically located between the coherence controller 232 and the memory controllers 212a-212b. Additionally, the memory caches 214a-214b may not participate in a cache coherency protocol. In other embodiments, the memory interface 210 may include a directory-based coherency protocol causing the coherency point may be located within the memory interface 210. In such embodiments, the memory caches 214a-214b may participate in the cache coherency protocol.

The memory caches 214a-214b may be used by each one of the multiple IC designs on the apparatus 200. The allocation policy for the memory caches 214a-214b may be programmable. The memory caches 214a-214b may also be used in a synchronous RAM (SRAM) mode for system boot and system debug. One or more memory channels 220a-220d may be connected to the memory interface 210.

The caches 214a-214b may store one or more blocks, each of which is a copy of data stored at a corresponding address in the system memory. As used herein, a "block" is a set of bytes stored in contiguous memory locations, which are treated as a unit for coherency purposes although the caches 214a-214b may not participate in the cache coherency protocol. As used herein, the terms "cache block", "block", "cache line", and "line" are interchangeable. The number of bytes in a block may be varied according to design choice, and may be of any size. As an example, 64 byte blocks may be used.

Each of the memory channels 220a-220d may be a separate interface to a memory, such as SDRAM. The memory controllers 212a-212b may include request queues for queuing memory requests. The memory controllers 212a-212b may also include logic for supporting a given protocol used to interface to the memory channels 220-220d. The protocol may determine values used for information transfer, such as a number of data transfers per clock cycle, signal voltage levels, signal timings, signal and clock phases and clock frequencies. Protocol examples include DDR2 (Double Data Rate, version 2) SDRAM, DDR3 SDRAM, GDDR4 (Graphics Double Data Rate, version 4) SDRAM, and GDDR5 (Graphics Double Data Rate, version 5) SDRAM.

The interface between the combination of the memory interface 210 and the coherency controller 232 and the remainder of the apparatus 200, which includes the multiple IC designs and the switch bars 234 and 236, includes multiple buses. Asynchronous memory requests, responses, snoops, snoop responses, and input/output (I/O) transactions are visible at this interface with temporal relationships.

The display controller 262 sends graphics output information that was rendered to one or more display devices. The rendering of the information may be performed by the display controller 262, by the video graphics controller 240, or by both controllers 262 and 240. Alternatively, the display controller 262 may send graphics output information to the video graphics controller 240 to be output to one or more display devices. The graphics output information may correspond to frame buffers accessed via a memory mapping to the memory space of a GPU within the video graphics controller 240. The memory mappings may be stored and updated in address translators. Video data read from the frame buffers stored in the off-die SDRAM or the on-die caches 214a-214b may include at least color values for each pixel on the screen.

The display controller 262 may include one or more display pipelines. Each display pipeline may send rendered graphical information to a separate display. For example, a display panel internal to a computing device that includes the apparatus 200 may be used. Additionally, at least a network-connected display may also be supported. Each display pipeline within the display controller 262 associated with a separate display screen may include one or more internal pixel-processing pipelines. A further description of the internal pixel-processing pipelines is provided shortly.

Each of the internal pixel-processing pipelines within the one or more display pipelines may independently and simultaneously access respective frame buffers stored in memory. Although the caches 214a-214b may reduce the average latency of memory access requests, the multiple sources accessing respective frame buffers may increase the number of conflict misses and increase the frequency of data eviction in the caches 214a-214b. Rather than have an entire frame buffer for a given source be assigned with common cache hint information, the cache hint information may alternate within the frame buffer. For example, the parameters N, M, and S described earlier may be used at least on a source basis.

In various embodiments, each of the internal pixel-processing pipelines may have respective N, M, and S parameters. In other embodiments, the granularity of the cache hint information may be less fine and set for each one of the display pipelines that include the internal pixel-processing pipelines. In such cases, the N, M, and S parameters for a given display pipeline may be associated with each of the one or more internal pixel-processing pipelines within the given display pipeline. Factors that may be used for setting the N, M, and S parameters may include user utilization, such as power-performance states; a number of active sources; and measured cache utilization.

In some embodiments, device drivers for the display controller 262 may set the parameters N, M, and S. These values may be stored in configuration registers within the display controller 262. In other embodiments, software may provide cache hint information to the cache controllers of the caches 214a-214b. Whether the cache hint information and the N, M, and S parameters are stored within the display controller 262 or within the cache controllers of the caches 214a-214b, the cache hint information may include information such as allocate normal, allocate sticky, deallocate, do not allocate, and so forth.

The allocate normal information may be used in response to determining a source has a high chance of reusing the data in its frame buffer. For example, the display screen may be idle; a browse use case predicts long pauses of no user interaction, during every other frame of 30 frames-per-second video playback, and so forth. The refresh rate of the display screen may be 60 frames-per-second, so a user reading search results during browsing may cause long pauses to updates on the display screen. The cache data blocks stored in the caches 214a-214b with an allocate normal state may be evicted from the caches 214a-214b by other source on the apparatus 200. The allocate sticky cache hint information may cause stored data to be exempt from eviction due to cache use by other sources on the apparatus 200. In some embodiments, a given time duration may be associated with the allocate sticky state for cache blocks in the caches 214a-214b.

The cache hint information may be provided on an entire frame buffer basis within a given source. Knowledge of the system-wide status of the apparatus 200, such as power-performance states, may be used to determine the cache hint information. If one or more internal pixel-processing pipelines include a mechanism for providing cache hint information, then this information may be combined by control logic with the N, M, and S parameters. The combination may yield an intermediate result for cache hint information to send to the memory controllers 212a-212b. The intermediate result may be on a basis with a finer granularity than an entire frame buffer. Referring again to FIG. 1, the cache hint information 130 suggesting video data is to be stored in on-die caches may be associated with stripes, a checkerboard formation, or other areas of the display screen 110, rather than be associated with the entire display screen 110. The selection of the shaded areas for the cache hint information 130 may be based on performance and power consumption tradeoffs, the system-wide state, cache utilization, and so forth.

Returning to FIG. 2 and continuing with the above description of combining cache hint information, the intermediate result may include one or more of the listed cache hint information described earlier, such as allocate normal and so forth. The memory controllers 212a-212b may combine the intermediate result in control logic with other factors to yield a final result. The final result may be sent to the cache controllers of the caches 214a-214b if the control logic in the memory controllers 212a-212b determines the associated video data is to be stored in the caches 214a-214b, rather than off-die SDRAM. Before providing details of methods using the N, M, and S parameters for setting cache hint information, a further description of the other components of the apparatus 200 is provided.

Each one of the processors 250a-250d may include one or more cores and one or more levels of a cache memory subsystem. Each core may support the out-of-order execution of one or more threads of a software process and include a multi-stage pipeline. Each one of the processors 250a-250d may include circuitry for executing instructions according to a predefined general-purpose instruction set. For example, the PowerPC® instruction set architecture (ISA) may be selected. Alternatively, the ARMO, x86®, x86-64®, Alpha®, MIPS®, PA-RISC®, SPARC® or any other instruction set architecture may be selected.

Generally, the processors 250a-250d may include multiple on-die levels (L1, L2, L3 and so forth) of caches for accessing data and instructions. If a requested block is not found in the on-die caches or in the off-die cache 252, then a read request for the missing block may be generated and transmitted to the memory interface 210 or to on-die flash memory (not shown) controlled by the flash controller 264. The flash memory may be a non-volatile memory block formed from an array of flash memory cells. Alternatively, the memory 250 may include other non-volatile memory technology. The bus interface unit (BIU) 254 may provide memory access requests and responses for at least the processors 250a-250d.

The processors 250a-250d may share the on-chip flash memory and the off-chip DRAM accessed through the memory interface 210 with other processing blocks, such as graphics processing units (GPUs), application specific integrated circuits (ASICs), and other types of processor cores. Therefore, typical SOC designs utilize acceleration engines, or accelerators, to efficiently coordinate memory accesses and support coherency transactions between processing blocks and peripherals. In a SOC design that includes multiple processors and processing blocks, these components communicate with each other to control access to shared resources. The coherence controller 232 in the fabric 230 may manage memory coherence.

Other processor cores on apparatus 200 may not include a mirrored silicon image of processors 250a-250d. These other processing blocks may have a micro-architecture different from the micro-architecture used by the processors 250*a*-250*d*. For example, other processors may have a micro-architecture that provides high instruction throughput for a computational intensive task, such as a single instruction multiple data (SIMD) core. Examples of SIMD cores include graphics processing units (GPUs), digital signal processing (DSP) cores, or other. For example, the video graphics controller 240 may include one or more GPUs for rendering graphics for games, user interface (UI) effects, and other applications.

The apparatus 200 may include processing blocks for real-time memory performance, such as the camera 260 and the display controller 262, as described earlier. In addition, the apparatus 200 may including processing blocks for non-real-time memory performance for image scaling, rotating, and color space conversion, accelerated video decoding for encoded movies, audio processing and so forth. The media controller 266 is one example. The I/O interface ports 270 may include interfaces well known in the art for one or more of a general-purpose I/O (GPIO), a universal serial bus (USB), a universal asynchronous receiver/transmitter (uART), a FireWire interface, an Ethernet interface, an analog-to-digital converter (ADC), a DAC, and so forth.

Figure 3:
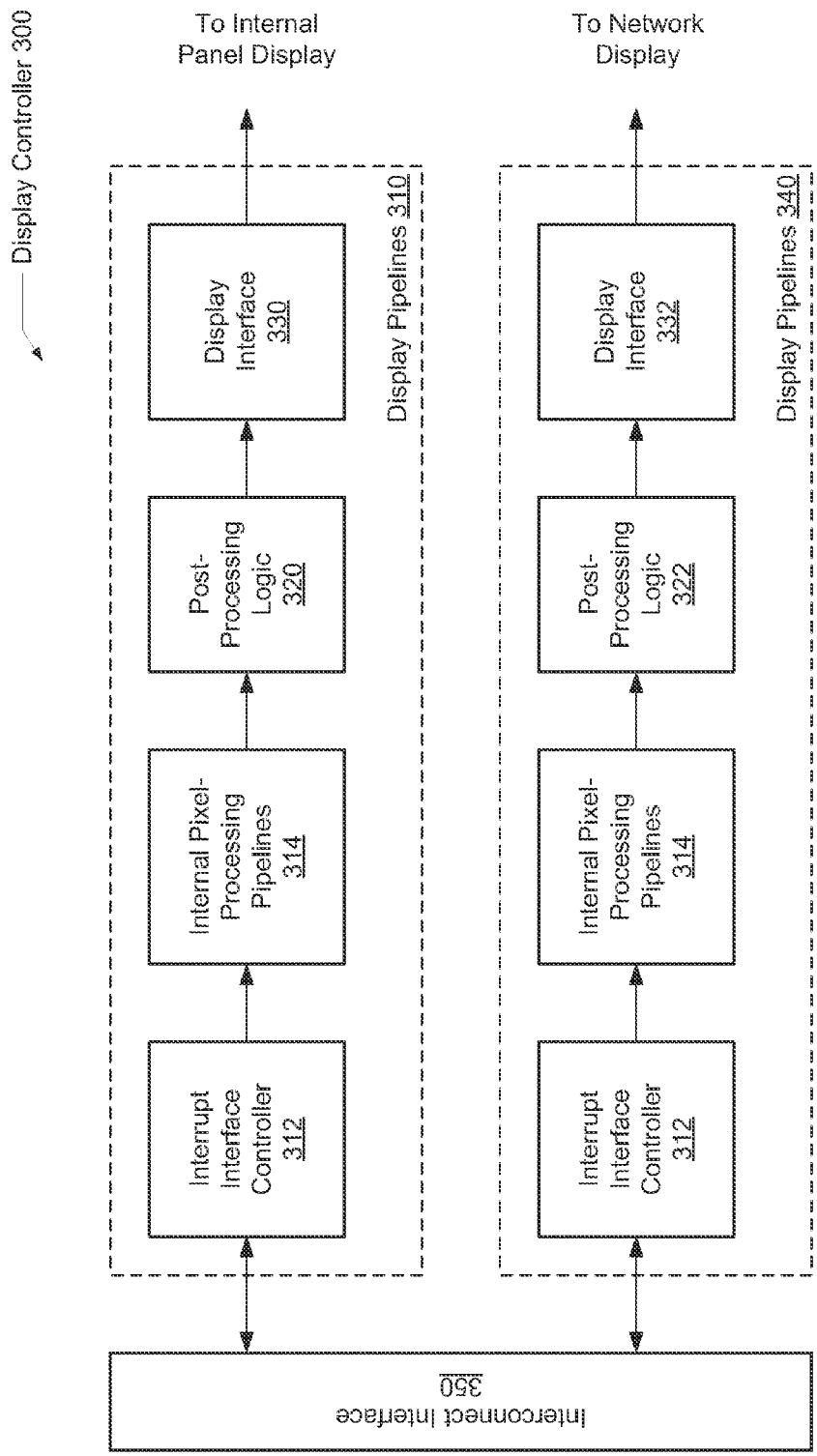
FIG. 3 is a generalized block diagram of a display controller.

Turning now to FIG. 3, a generalized block diagram of one embodiment of a display controller 300 is shown. The display controller 300 includes an interconnect interface 350 and two display pipelines 310 and 340. Although two display pipelines are shown, the display controller 300 may include another number of display pipelines. Each of the display pipelines may be associated with a separate display screen. For example, the display pipeline 310 may send rendered graphical information to an internal display panel. The display pipeline 340 may send rendered graphical information to a network-connected display. Other examples of display screens may also be possible and contemplated.

The interconnect interface 350 may include multiplexers and control logic for routing signals and packets between the display pipelines 310 and 340 and a high-level fabric. Each of the display pipelines may include an interrupt interface controller 312. The interrupt interface controller 312 may include logic to expand a number of sources or external devices to generate interrupts to be presented to the internal pixel-processing pipelines 314. The controller 312 may provide encoding schemes, registers for storing interrupt vector addresses, and control logic for checking, enabling, and acknowledging interrupts. The number of interrupts and a selected protocol may be configurable. In some embodiments, the controller 312 uses the AMBA® AXI (Advanced eXtensible Interface) specification.

Each display pipeline within the display controller 262 may include one or more internal pixel-processing pipelines 314. The internal pixel-processing pipelines 314 may include one or more ARGB (Alpha, Red, Green, Blue) pipelines for processing and displaying user interface (UI) layers. The internal pixel-processing pipelines 314 may include one or more pipelines for processing and displaying video content such as YUV content. In some embodiments, each of the internal pixel-processing pipelines 314 include blending circuitry for blending graphical information before sending the information as output to respective displays.

A layer may refer to a presentation layer. A presentation layer may consist of multiple software components used to define one or more images to present to a user. The UI layer may include components for at least managing visual layouts and styles and organizing browses, searches, and displayed data. The presentation layer may interact with process components for orchestrating user interactions and also with the business or application layer and the data access layer to form an overall solution. However, the internal pixel-processing pipelines 314 handle the UI layer portion of the solution.

The YUV content is a type of video signal that consists of three separate signals. One signal is for luminance or brightness. Two other signals are for chrominance or colors. The YUV content may replace the traditional composite video signal. The MPEG-2 encoding system in the DVD format uses YUV content. The internal pixel-processing pipelines 314 handle the rendering of the YUV content. A further description of the internal pixel-processing pipelines is provided shortly.

In various embodiments, each of the pipelines within the internal pixel-processing pipelines 314 may have respective N, M, and S parameters. In other embodiments, the granularity of the cache hint information may be less fine and set for each one of the display pipelines 310 and 340. Factors that may be used for setting the N, M, and S parameters may include user utilization, such as power-performance states; a number of active sources; and measured cache utilization.

The display pipeline 310 may include post-processing logic 320. The post-processing logic 320 may be used for color management, ambient-adaptive pixel (AAP) modification, dynamic backlight control (DPB), panel gamma correction, and dither. The display interface 330 may handle the protocol for communicating with the internal panel display. For example, the Mobile Industry Processor Interface (MIPI) Display Serial Interface (DSI) specification may be used. Alternatively, a 4-lane Embedded DisplayPort (eDP) specification may be used.

The display pipeline 340 may include post-processing logic 322. The post-processing logic 322 may be used for supporting scaling using a 5-tap vertical, 9-tap horizontal, 16-phase filter. The post-processing logic 322 may also support chroma subsampling, dithering, and write back into memory using the ARGB888 (Alpha, Red, Green, Blue) format or the YUV420 format. The display interface 332 may handle the protocol for communicating with the network-connected display. A direct memory access (DMA) interface may be used.

Figure 4:
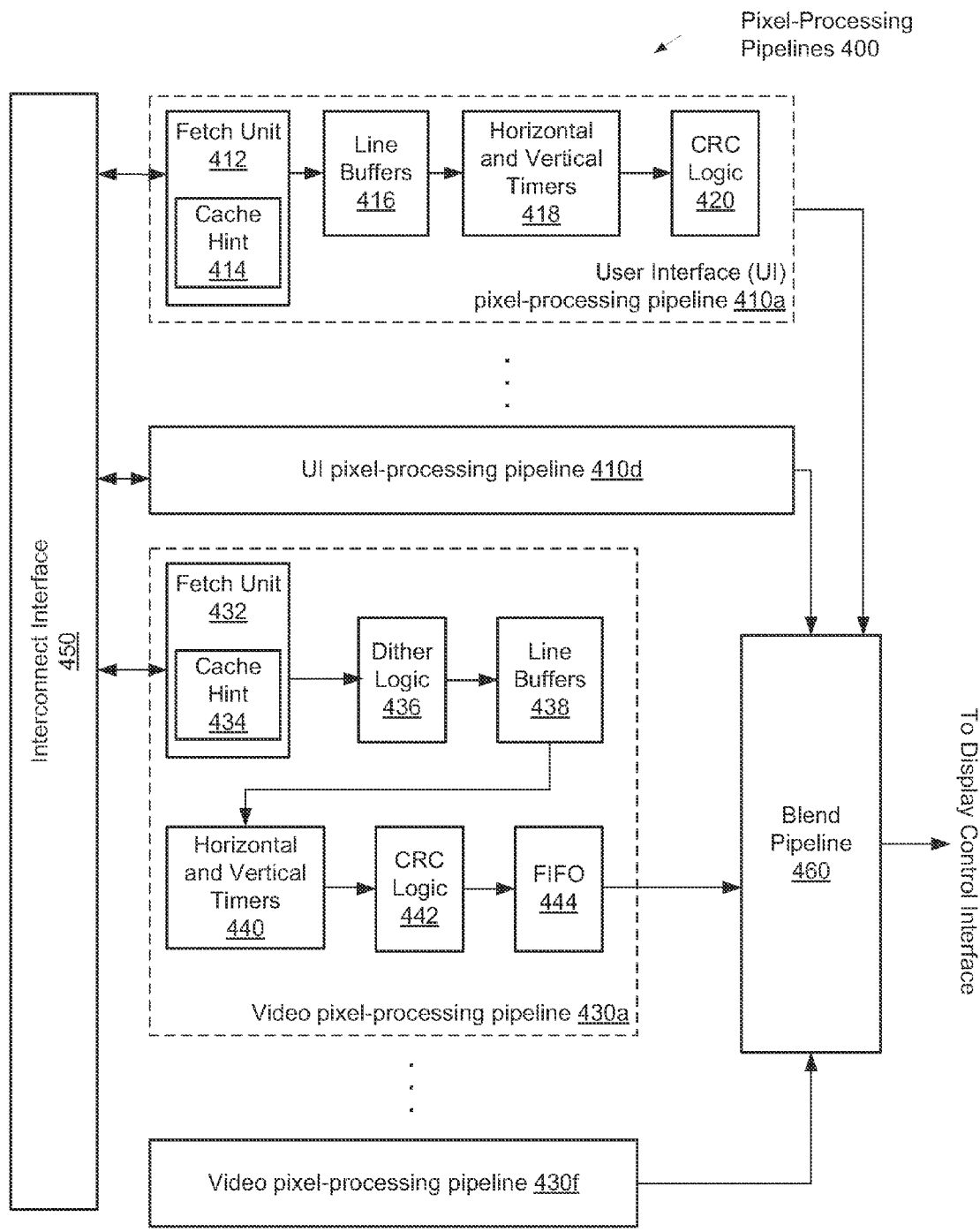
FIG. 4 is a generalized block diagram of pixel-processing pipelines.

Turning now to FIG. 4, a generalized block diagram of one embodiment of the pixel-processing pipelines 400 within the display pipelines is shown. Each of the display pipelines within a display controller may include the pixel-processing pipelines 400. The pipelines 400 may include user interface (UI) pixel-processing pipelines 410*a*-410*d* and video pixel-processing pipelines 430*a*-430*f*.

The interconnect interface 450 may act as a master and a slave interface to other blocks within an associated display pipeline. Read requests may be sent out and incoming data may be received. The outputs of the pipelines 410*a*-410*d* and the pipelines 430*a*-430*f* are sent to the blend pipeline 460. The blend pipeline 460 may blend the output of a given pixel-processing pipeline with the outputs of other active pixel-processing pipelines.

The UI pipelines 410*a*-410*d* may be used to present one or more images of a user interface to a user. A fetch unit 412 may send out read requests for video data and receive responses. The cache hint block 414 may include respective N, M, and S parameters for an associated one of the UI pipelines 410*a*-410*d*. The cache hint block 414 may include programmable configuration registers for storing and updating the N, M, and S parameters. Alternatively, the cache hint block 414 may be located within the interconnect interface 450. In yet other embodiments, the N, M, and S parameters may be stored outside the pixel-processing pipelines 400. In some embodiments, a single set of the N, M, and S parameters may be used for all of the pipelines 410a-410d. In yet other embodiments, a single set of the N, M, and S parameters may be used for all of the pipelines 410a-410d and pipelines 430a-430f.

The line buffers 416 may store the incoming video data corresponding to row lines of a respective display screen. The horizontal and vertical timers 418 may maintain the pixel pulse counts in the horizontal and vertical dimensions of a corresponding display device. A vertical timer may maintain a line count and provide a current line count to comparators. The vertical timer may also send an indication when an end-of-line (EOL) is reached.

The Cyclic Redundancy Check (CRC) logic block 420 may perform a verification step at the end of the pipeline. The verification step may provide a simple mechanism for verifying the correctness of the video output. This step may be used in a test or a verification mode to determine whether a respective display pipeline is operational without having to attach an external display. A CRC register may be initialized at reset or restart. In some embodiments, the CRC register is a 32-bit register. When enabled, the CRC generation proceeds until the next time a reset or a restart occurs. The CRC register may be read anytime but to insure that the CRC contents are not destroyed from frame-to-frame, a snapshot of the CRC register may be taken whenever there is a restart occurs. The contents of a CRC Snapshot Register may be read while a signature for the next frame is being generated.

Within the video pipelines 430a-430f, the blocks 432, 434, 438, 440, and 442 may provide functionality corresponding to the descriptions for the blocks 412, 414, 416, 418, and 420 within the UI pipelines. The fetch unit 432 fetches video frame data in various YCbCr formats. The dither logic 436 inserts random noise (dither) into the samples. The timers and logic in block 440 scale the data in both vertical and horizontal directions.

Figure 5:
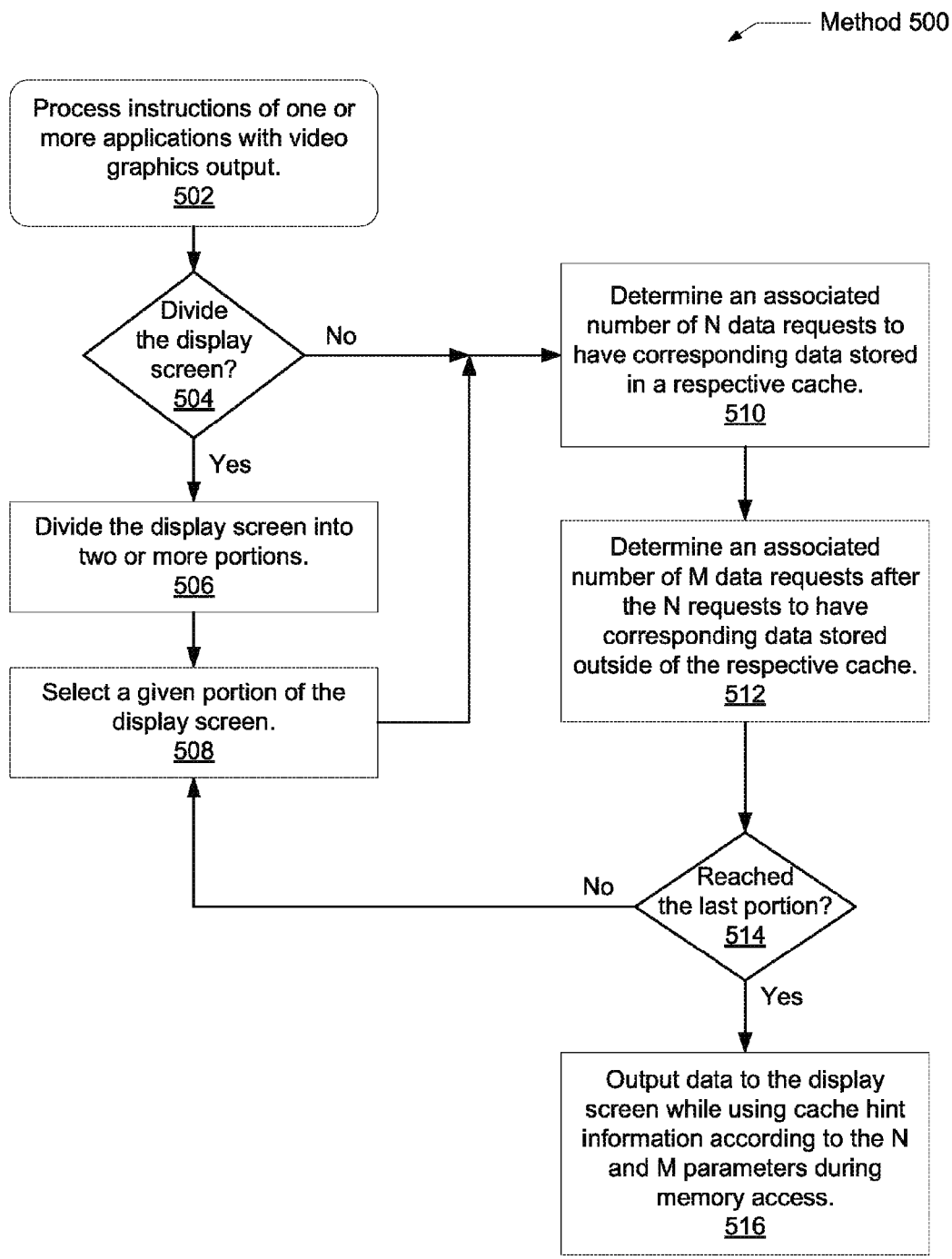
FIG. 5 is a generalized flow diagram of one embodiment of a method for determining alternating cache hint information for a given frame buffer.

Referring now to FIG. 5, a generalized flow diagram of one embodiment of a method 500 for determining alternating cache hint information for a given frame buffer is shown. For purposes of discussion, the steps in this embodiment are shown in sequential order. However, in other embodiments some steps may occur in a different order than shown, some steps may be performed concurrently, some steps may be combined with other steps, and some steps may be absent.

In block 502, instructions of one or more software applications are processed by a computing system. In some embodiments, the computing system is an embedded system. A given display screen of one or more display screens may be handled for video data storage as a single entity. However, in some case, the given display screen may be divided into multiple portions regarding video data storage. For example, a border of a media player shown on screen does not change for an appreciable time while the video window portion may move and freeze at different points in time. The border may include buttons, a color scheme and a texture that does not change while the media player application is executed. Similarly, a border for a drawing application, a computer game, and so forth may include borders with visual characteristics that do not change for an appreciable amount of time. The internal window, however, may include graphical information that alternates between motion and idle times. The dimensions of the border may be known. Therefore, the overall display screen may be divided into multiple portions, such as portions associated with the border and portions associated with the internal window.

If it is determined a given display screen of one or more display screens is to be divided into multiple portions (conditional block 504), then in block 506, the display screen is divided. The display screen may be divided based on the currently executing software application and the dimensions of an associated visual border and internal window. In block 508, a given portion of the multiple portions in the display screen may be selected. Control flow of method 500 then moves to block 510. If it is determined a given display screen of one or more display screens is not to be divided into multiple portions (conditional block 504), then control flow of method 500 moves to block 510.

In block 510, a number N of successive memory access requests to include hint information indicating storing data in an on-die cache may be set. As described earlier, the number or parameter N may be set for multiple directions on the display screen. For example, a first parameter N may be set for a left-to-right x-direction (horizontal direction). In addition, a second parameter N may be set for a top-to-bottom y-direction (vertical direction). These parameters may be set for these directions within a selected portion if the display screen is divided. Alternatively, these parameters may be set for these directions for the entire display screen if the display screen is not divided.

In block 512, a number M of successive memory access requests to include hint information indicating storing data outside an on-die cache may be set. As described earlier, the parameter M may be set for multiple directions on the display screen, such as the horizontal direction and the vertical direction. The multiple parameters may be set for the selected portion if the display screen is divided. In some embodiments, the parameter M follows the parameter N. However, in other embodiments, the parameter N may follow the parameter M. In yet other embodiments, a third programmable parameter, S, may determine which of the N and the M parameters follows the other.

In various embodiments, an initial value may be set for the N, M and S parameters. These initial values may be written into configuration registers by software, such as a device driver for the display controller. The configuration registers may be read by hardware circuitry within the display controller for determining the type of cache hint information to send to the memory controller with associated memory access requests. The parameters may be changed as the application executes on the computing system, such as an embedded system. In other embodiments, the parameters may not have be initially set, but changed as the application is executed on the computing system.

The device driver for the display controller may include both user-mode components and kernel-mode components. A graphics hardware vendor may supply the user-mode graphics driver and the kernel-mode graphics driver. The operation system (OS) may load a separate copy of the user-mode driver for each application. The user-mode graphics driver may be a dynamic-link library (DLL) that is loaded by corresponding application programming interfaces (APIs) in the OS graphics APIs. Alternatively, runtime code may be used to install the user-mode graphics driver.

In various embodiments, corresponding graphics libraries and drivers may determine and pass the N, M, and S video data cache hint information from the software application to the computing system, such as to configuration registers within the display controller. Factors that may be used for setting the N and M parameters may include user utilization, such as power-performance states; a number of active sources for respective video data; and measured cache utilization. In some cases, the user-mode graphics driver may be an extension to the Direct3D and OpenGL software development kits (SDKs). Accordingly, the determination and passing of the video data cache hint information may be made available through a standard interface.

If a last portion is not reached (conditional block 514), then control flow of method 500 returns to block 508. Otherwise, in block 516, rendered video data is sent to the display screen while using cache hint information according to the N and M parameters during memory access.

Figure 6:
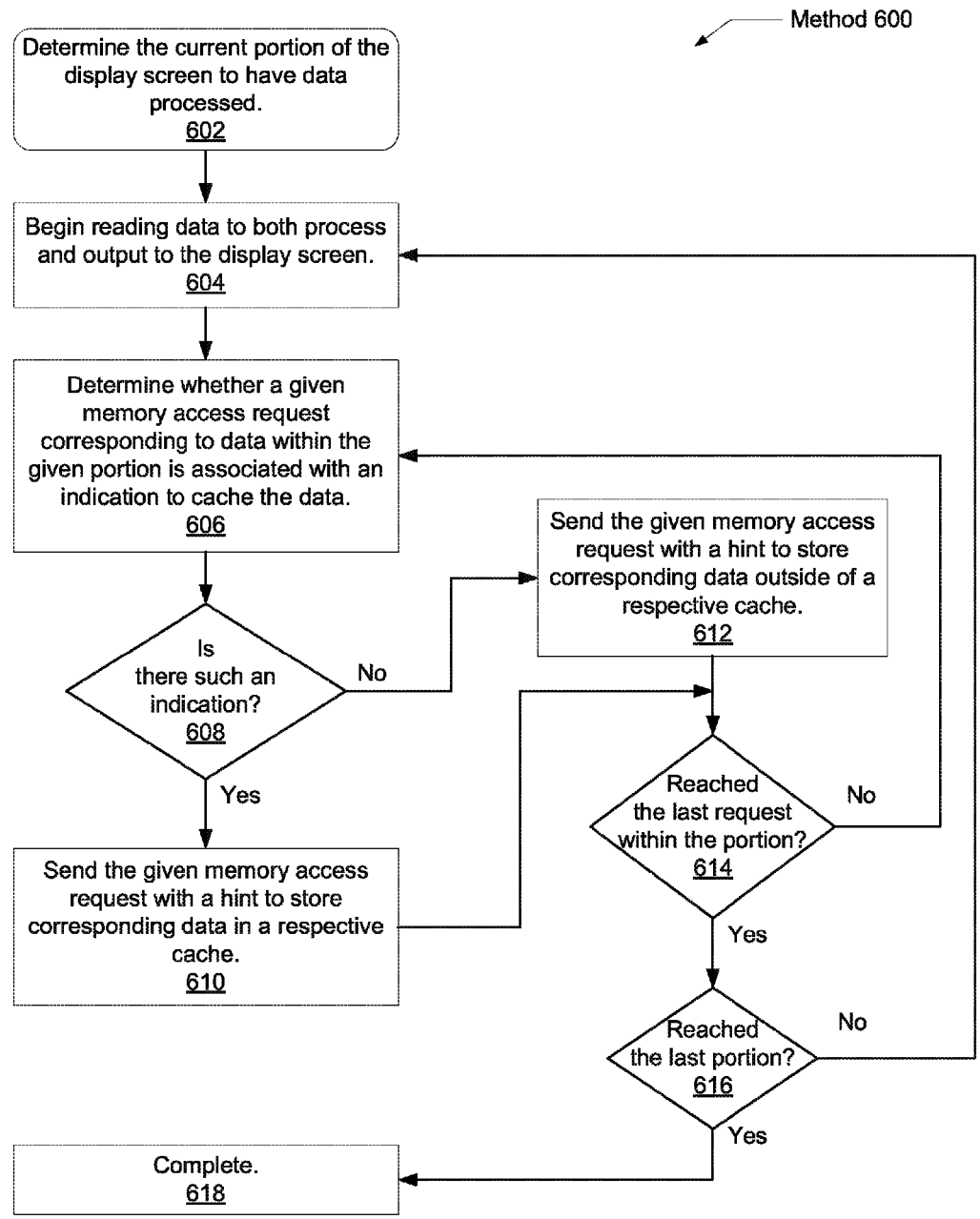
FIG. 6 is a generalized flow diagram of one embodiment of a method for using alternating cache hint information for a given frame buffer.

Referring now to FIG. 6, a generalized flow diagram of one embodiment of a method 600 for using alternating cache hint information for a given frame buffer is shown. For purposes of discussion, the steps in this embodiment are shown in sequential order. However, in other embodiments some steps may occur in a different order than shown, some steps may be performed concurrently, some steps may be combined with other steps, and some steps may be absent.

In block 602, the current portion of the display screen to have data processed is determined. For example, if the screen is about to be refreshed, the current portion may be the left-most data segment of the top-most row line of the display screen. If the processing has already started, the current portion may be elsewhere on the display screen. In block 604, a process is begun to read video data for a given frame buffer from memory. The video data is processed or rendered by graphics processing logic and output to the display screen.

In block 606, it is determined whether a given memory access request corresponding to data within the given portion is associated with an indication to cache the data. For example, when combined by control logic, the previously described parameters N, M, and S for both the horizontal and the vertical directions may indicate the video data read from memory is to be stored in a cache. In addition, the parameters N, M, and S may be associated with a given source, such as a user interface layer or a YUV video content source. Further the parameters N, M, and S may be associated with a particular software application. Referring again to FIG. 1, there are areas of the display screen 110 marked by the shading used for the cache hint information 130. These areas are portions of the display screen 110 with corresponding video data being suggested to be stored in an on-die cache. A given memory access request to be sent to the memory controller may be associated with video data corresponding to these shaded areas of the display screen 110.

Returning to method 600 in FIG. 6, if an indication is output from control logic to suggest caching the associated video data for the given memory access request (conditional block 608), then in block 610, the given memory access request may be sent to the memory controller with cache hint information to store corresponding data in a respective on-die cache. If an indication is output from control logic not suggesting to cache the associated video data for the given memory access request (conditional block 608), then in block 612, the given memory access request may be sent to the memory controller with cache hint information to store corresponding data outside a respective on-die cache.

The memory controller receives both the given memory access request and the associated cache hint information. However, the memory controller may not follow the received cache hint information. The received cache hint information may act as a suggestion to the memory controller rather than as a directive. The received cache hint information may be input to control logic within the memory controller and used to determine where to store the associated video data. The received cache hint information may be one of several factors used to make the determination.

Whether a portion is the entire display screen or a fraction of the entire display screen, multiple memory access requests are typically used to access corresponding video data for the portion. If the last memory access request for the portion has not been reached (conditional block 614), then control flow of method 600 returns to block 606. If the last memory access request for the portion has been reached (conditional block 614) and if the last portion has been reached, then in block 618, then the presentation of the current image on the display screen is completed. A same or new image may be presented in the next frame and the steps of method 600 may be repeated. Otherwise, the method 600 may return to block 604.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a computer readable storage medium. Numerous types of storage media are available. The storage medium may be accessible by a computer during use to provide the program instructions and accompanying data to the computer for program execution. In some embodiments, a synthesis tool reads the program instructions in order to produce a netlist comprising a list of gates from a synthesis library.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus comprising:
   a memory controller configured to control access to a memory;
   a memory cache configured to store data read from the memory; and
   a display controller configured to generate frame data read requests;
   wherein when generating frame data read requests, the display controller is configured to utilize parameters which indicate how a sequence of two or more of the frame data read requests are to be generated, wherein at least one of the frame data read requests is generated with a cache hint that indicates corresponding frame data is to be cached, and at least one of the frame data read requests is generated with a cache hint that indicates corresponding frame data is not to be cached;
   wherein said parameters comprise at least first integers N and M, wherein N indicates how many sequential frame data read requests are to include a cache hint that indicates corresponding frame data is to be cached, and wherein M indicates how many sequential frame data read requests following the N read requests are to include a cache hint that indicates corresponding frame data is not to be cached.

2. The apparatus as recited in claim 1, wherein said sequential frame data read requests correspond to frame data along either an x-axis of a display or a y-axis of a display.

3. The apparatus as recited in claim 2, wherein in response to determining memory access latency is to be reduced, the numbers N and M are set to respective values less than a number of memory access requests used to read frame data for an entire row line of a respective display.

4. The apparatus as recited in claim 2, wherein the one or more internal display pipelines comprise at least one of the following: a user interface (UI) pixel-processing pipeline and a video pixel-processing pipeline.

5. The apparatus as recited in claim 4, wherein the apparatus further comprises a plurality of functional blocks, each configured to access the memory cache, wherein the numbers N and M are further based on at least one of the following: utilization of the memory cache, a power-performance state of the semiconductor chip, and a number of functional blocks currently accessing the memory cache.

6. The apparatus as recited in claim 5, wherein the memory is an external memory located outside of the apparatus.

7. The apparatus as recited in claim 2, wherein the cache hint information further indicates at least one of the following types of cache block handling: allocate normal, allocate sticky, do not allocate, and deallocate.

8. The apparatus as recited in claim 1, wherein said sequential frame data read requests correspond to frame data along an x-axis of a display, and wherein said parameters further comprise at least second integers N and M, wherein the second integer N and the second integer M correspond to a y-axis of the display, and the second integer N indicates how many sequential frame data read requests along the y-axis are to include a cache hint that indicates corresponding frame data is to be cached, and wherein the second integer M indicates how many sequential frame data read requests following the N read requests along the y-axis are to include a cache hint that indicates corresponding frame data is not to be cached.

9. The apparatus as recited in claim 8, wherein frame data is cached when both x-axis frame data read requests and y-axis frame data read requests for given data indicate caching is desired.

10. A method comprising:
storing parameters which indicate how a sequence of two or more frame data read requests are to be generated; and
generating said sequence of two or more frame data read requests utilizing said parameters, wherein at least one of the frame data read requests is generated with a cache hint that indicates corresponding frame data is to be cached, and at least one of the frame data read requests is generated with a cache hint that indicates corresponding frame data is not to be cached;
wherein said parameters comprise at least first integers N and M, wherein N indicates how many sequential frame data read requests are to include a cache hint that indicates corresponding frame data is to be cached, and wherein M indicates how many sequential frame data read requests following the N read requests are to include a cache hint that indicates corresponding frame data is not to be cached.

11. The method as recited in claim 10, wherein said sequential frame data read requests correspond to frame data along either an x-axis of a display or a y-axis of a display.

12. The method as recited in claim 10, wherein said sequential frame data read requests correspond to frame data along an x-axis of a display, and wherein said parameters further comprise at least second integers N and M, wherein the second integer N and the second integer M correspond to a y-axis of the display, and the second integer N indicates how many sequential frame data read requests along the y-axis are to include a cache hint that indicates corresponding frame data is to be cached, and wherein the second integer M indicates how many sequential frame data read requests following the N read requests along the y-axis are to include a cache hint that indicates corresponding frame data is not to be cached.

13. The method as recited in claim 12, wherein frame data is cached when both x-axis frame data read requests and y-axis frame data read requests for given data indicate caching is desired.

14. The method as recited in claim 13, wherein the numbers N and M are further based on at least one of the following: utilization of the memory cache, a power-performance state of a system comprising the memory cache, and a number of functional blocks configured to access the memory cache, which are currently accessing the memory cache.

15. The method as recited in claim 13, wherein a display screen corresponding to a given one of the one or more internal display pipelines is divided into a plurality of portions, wherein the numbers N and M are further based on a given one of the plurality of portions.

16. A display controller comprising:
an interface configured to receive frame data for a given display frame;
one or more internal pipelines, each configured to process the received frame data for a respective display source; and
control logic, wherein said control logic is configured to generate frame data read requests with a cache hint which indicates whether corresponding frame data is to be cached, and wherein said frame data read requests are generated with cache hints which alternate between cache and do not cache according to a desired pattern;
wherein said pattern is indicated by parameters which comprise at least first integers N and M, wherein N indicates how many sequential frame data read requests are to include a cache hint that indicates corresponding frame data is to be cached, and wherein M indicates how many sequential frame data read requests following the N read requests are to include a cache hint that indicates corresponding frame data is not to be cached.

17. The display controller as recited in claim 16, wherein said parameters correspond to frame data along an x-axis of a display, and wherein said parameters further comprise at least second integers N and M, wherein the second integer N and the second integer M correspond to a y-axis of the display, and the second integer N indicates how many sequential frame data read requests along the y-axis are to include a cache hint that indicates corresponding frame data is to be cached, and wherein the second integer M indicates how many sequential frame data read requests following the N read requests along the y-axis are to include a cache hint that indicates corresponding frame data is not to be cached.

18. The display controller as recited in claim 17, wherein the parameters N and M are based on at least one of the following: a given one of the one or more internal pipelines currently generating memory access requests, utilization of the memory cache, a power-performance state of a system comprising the memory cache, and a number of functional blocks external to the display controller configured to access the memory cache, which are currently accessing the memory cache.

19. A non-transitory computer readable storage medium comprising program instructions operable to efficiently allocate data in a memory hierarchy, wherein the program instructions are executable by a processor to perform a method comprising:
storing parameters which indicate how a sequence of two or more frame data read requests are to be generated; and
generating the sequence of two or more frame data read requests utilizing said parameters, wherein at least one of the frame data read requests is generated with a cache hint that indicates corresponding frame data is to be cached, and at least one of the frame data read requests is generated with a cache hint that indicates corresponding frame data is not to be cached;
wherein said parameters comprise at least first integers N and M, wherein N indicates how many sequential frame data read requests are to include a cache hint that indicates corresponding frame data is to be cached, and wherein M indicates how many sequential frame data read requests following the N read requests are to include a cache hint that indicates corresponding frame data is not to be cached.

* * * * *